United States Patent [19]

Bendickson et al.

[11] Patent Number: 4,498,244

[45] Date of Patent: Feb. 12, 1985

[54] TARGET INCLUDING SLIDING SCALE

[75] Inventors: Roy B. Bendickson; Alfred A. Wridt, both of Racine, Wis.

[73] Assignee: Snap-on Tools Corporation, Kenosha, Wis.

[21] Appl. No.: 542,260

[22] Filed: Oct. 14, 1983

[51] Int. Cl.³ .............................................. G01B 7/315
[52] U.S. Cl. ............................ 33/203.15; 33/180 AT; 33/288
[58] Field of Search ............ 33/286, 288, 264, 143 R, 33/203, 203.15, 180 AT, 203.16, 203.17

[56] References Cited

U.S. PATENT DOCUMENTS

| | | | |
|---|---|---|---|
| 2,249,226 | 7/1941 | Peters | 33/288 |
| 3,091,862 | 6/1963 | MacMillan | 33/203 |
| 3,758,958 | 9/1973 | Jordan | 33/203.15 |
| 4,058,903 | 11/1977 | Wilkerson | 33/288 |
| 4,172,326 | 10/1979 | Henter | 33/288 |
| 4,303,338 | 12/1981 | Morrison et al. | 33/288 |
| 4,330,945 | 5/1982 | Eck | 33/288 |
| 4,375,130 | 3/1983 | Lill | 33/288 |
| 4,377,038 | 3/1983 | Ragan | 33/288 |
| 4,416,065 | 11/1983 | Hunter | 33/288 |

FOREIGN PATENT DOCUMENTS 1551039  12/1968  France ............................... 33/203.17

Primary Examiner—Willis Little
Attorney, Agent, or Firm—Emrich & Dithmar

[57] ABSTRACT

The target includes an L-shaped member in which the short leg defines a fixed jaw. A second jaw is slidably mounted on the long arm of the member, which jaw is associated with latching means so that the two jaws can engage against the opposite side walls of a tire and be retained thereby. A second arm is spaced from and attached to the first arm and slidably carries a scale.

25 Claims, 7 Drawing Figures

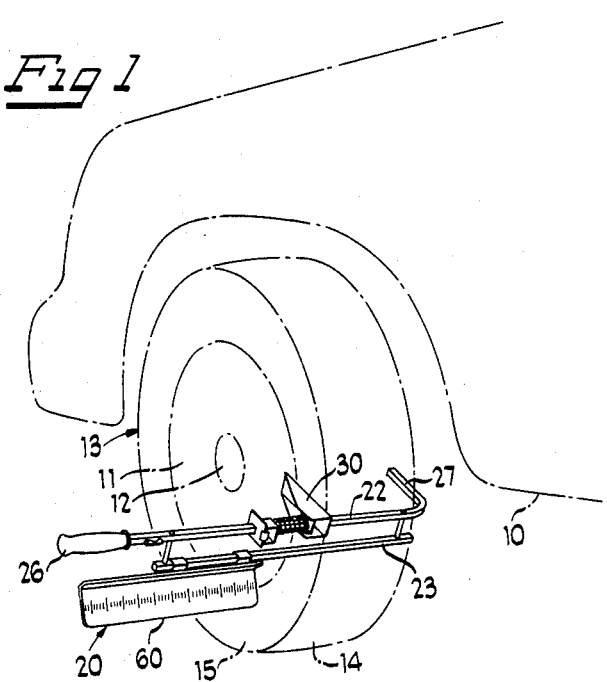
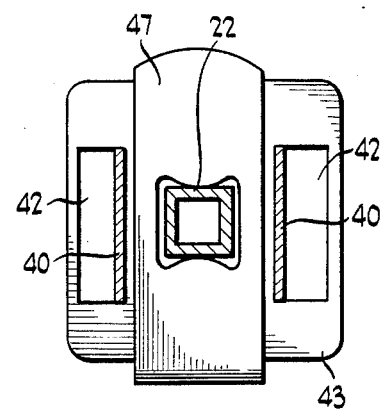
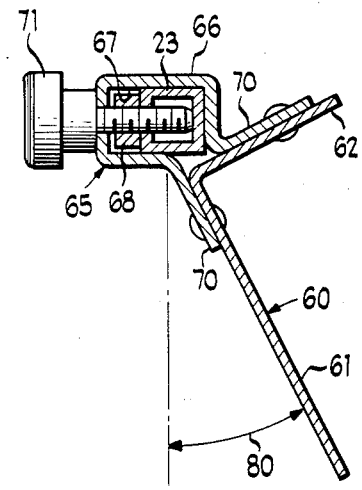
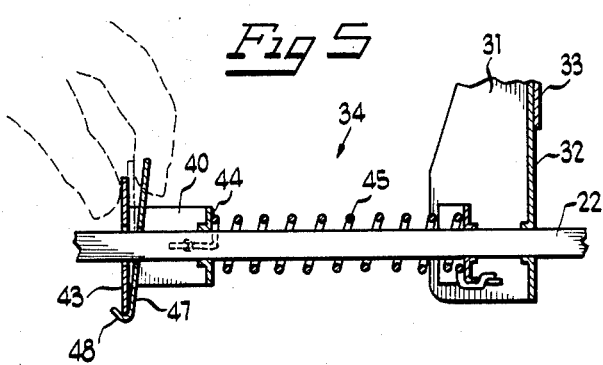
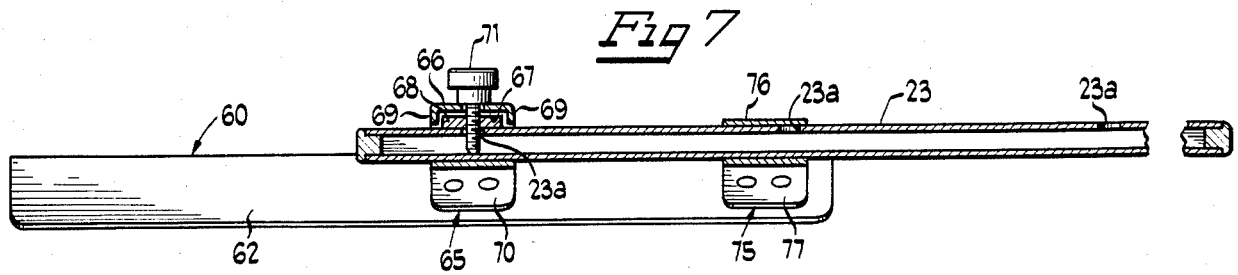

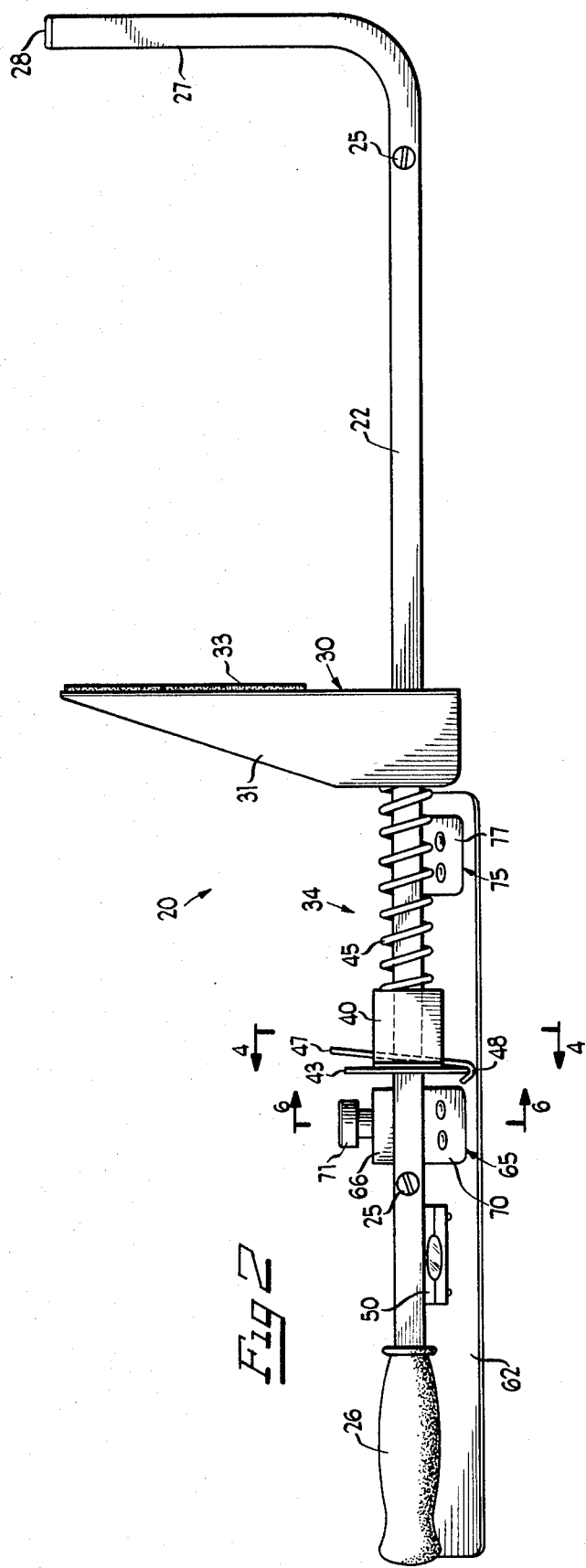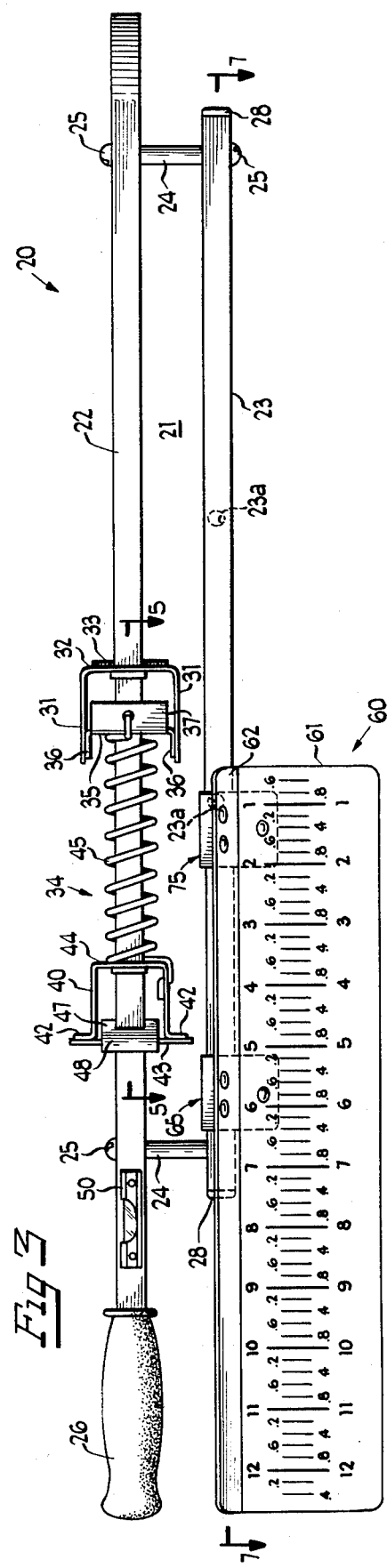

TARGET INCLUDING SLIDING SCALE

BACKGROUND OF THE INVENTION

In observing and adjusting the track of a wheeled vehicle such as an automobile or truck, a source of a beam of light or light projector is mounted on one wheel and a scale on the other wheel on the same side of the vehicle. "Track" refers to the ability of the rear wheels to follow the path set by the front wheels. The scale bears graduations which are impinged by the projected light, signifying to the mechanic the extent to which the wheels are in track. Adjustments to the steering or suspension linkage can be made to adjust the track to be within acceptable limits for the vehicle.

Prior art scales are attached to structure that is mountable on the hub of the wheel or on the tread surface of the tire carried by the wheel. There are disadvantages of both. When the scale is attached to the hub, measurements from a reference point of the vehicle, such as the body frame, drive shaft or side wall, to the scale cannot readily be made. Such measurements are also difficult to make with respect to a scale mounted on the tread surface. Certain such prior art devices contact the outer side wall of the tire at its bottom, so that the scale is not oriented horizontally.

SUMMARY OF THE INVENTION

It is therefore an important object of the present invention to provide a target for use in equipment for aligning a vehicular wheel, which is so located with respect to the wheel that its distance from a measuring point on the vehicle, such as the body, frame, drive shaft or side wall of the tire itself, can be readily determined.

Another object is to provide such a target which can be slid toward and away from the vehicle and then latched at a selected position.

Another object is to provide such a target which includes structure that grips the tire side walls.

Another object is to provide such a target having a scale which can be oriented horizontally in use.

Another object is to provide such a target in which the scale is outside of the cylinder defined by the tread surface of the tire.

In summary, there is provided a target for use in equipment for aligning a vehicular wheel which carries a tire thereon having a tread surface and a pair of side walls, the target comprising an elongated body, first and second jaws depending from the body for respectively engaging the side walls of the tire, at least one of the jaws being movable toward and away from the other of the jaws, first means for latching the jaws at a selected spacing therebetween so as to be mounted on the tire, scale means slidably carried by the body, and second means for latching the scale at a selected position on the body.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a target incorporating the features of the present invention, mounted on an automobile, a portion of which is shown in phantom;

FIG. 2 is a top plan view of the target;

FIG. 3 is a front elevational view of the target;

FIG. 4 is an enlarged view in vertical section taken along the line 4—4 of FIG. 2;

FIG. 5 is a fragmentary view of a portion of the target and a person's hand in phantom, showing the manner in which the target is applied to and removed from a tire;

FIG. 6 is an enlarged view in vertical section taken along the line 6—6 of FIG. 2; and FIG. 7 is a fragmentary view in section taken along the line 7—7 of FIG. 3.

DETAILED DESCRIPTION OF THE PREFERRED EMBODIMENT

In FIG. 1, the front, left side of an automobile 10 is depicted in phantom, the automobile having a wheel 11 and a hub 12 attached to a shaft (not shown). Carried by the wheel 11 is a tire 13 having a cylindrical tread surface 14 and a pair of side walls 15 (only one is shown).

To measure the so-called "track" of an automobile, a target 20 incorporating the features of the present invention is mounted on the front tire 13. Attached to the rear wheel or tire on the same side of the vehicle is a light projector (not shown) which generates a beam of light aimed at the target 20. By noting the point of impingement of the light beam on a scale associated with the target 20, as will be explained, and by making a number of other measurements, a mechanic can determine the extent to which the front and rear wheels track. Certain adjustments are made in the steering linkage(s) or the suspension system to adjust the track, if needed. Another target identical to the target 20, but a mirror image thereof, and an associated light generator are mounted on the other side of the vehicle. Certain procedures require switching the targets and light projectors both front to back and side to side.

Referring to FIGS. 2 and 3, the target 20 includes an elongated body 21 defined by a pair of laterally spaced apart and parallel arms 22 and 23. The arm 23 has three detent openings 23a at predetermined locations on the rear surface thereof. A pair of spacers 24 hold the arms 22 and 23 in spaced, parallel relationship. Screws 25 pass through the arms 22 and 23 and are threaded into the spacers 24. In the embodiment shown, the arm 23 is formed of a straight length of square tubing. The arm 22 is defined by the longer leg of an L-shaped member, which in the embodiment depicted, is a square tube. A handle 26 is attached to the left-hand end of the arm 23. The shorter leg of the L-shaped member defines a fixed jaw 27. Plastic end caps 28 are applied to the ends of the arm 23 and to the free end of the jaw 27.

The target 20 includes a movable jaw 30 which is generally U-shaped in transverse cross section, having parallel sides 31 and a connecting wall 32. A pad 33 is attached to the connecting wall 32 which is of sandpaper-like finish to facilitate gripping the tire. The connecting wall 32 has a square opening therein of a size slightly larger than the cross section of the arm 22 so that the jaw 30 is freely movable thereon. The sides 31 taper toward the connecting wall 32 at the outer ends thereof.

The target 20 further comprises a latching means 34, which includes a bearing plate 35 from which extend two integral side flanges 36 and one end flange 37. The side flanges 36 are welded to the interior of the sides 31 adjacent to the inner ends thereof. The latching means 34 further includes a U-shaped bearing member 40 having end flanges 42 which are welded to a plate 43. The connecting wall 44 of the bearing member and the plate 43 have square openings respectively therein slightly larger than the cross section of the arm 22 so as to be slidably movable thereon. The latching means 34 further include a compression spring 45 having one end looped into a hole in the end flange 37 and the other end attached to the member 40. Referring also to FIG. 4, the latching means 34 further includes a release lever 47. A lip 48 is formed on the lever 47 at an acute angle therewith. The lever 47 has a generally square opening therein which is slightly larger than the cross section of the arm 22 so as to be freely movable thereon. The opening has two arcuate sides oriented as shown. The lever 47 is located between the wall 44 and the plate 43, with the lip 48 of the lever 47 enveloping one edge of the plate 43.

Referring to FIG. 5, to mount the target 20 on a tire, the distal end of the lever 47 is drawn against the plate 43 to place the latching means 34 in its release position, as shown in phantom in FIG. 5. The lever 47 is held against the plate 43 and the two are drawn toward the handle 26. Such action draws the spring 45 and thus the movable jaw 30 away from the jaw 27, until the space between them exceeds the width of the tire. Referring to FIGS. 1-3, the mechanic can grip the target 20 by holding the handle 26 in one hand. Then the target is positioned such that the jaw 27 is located adjacent to but spaced from the inner side wall of the tire and the jaw 30 is adjacent to but spaced from the outer side wall of the tire. While holding the handle 26 in one hand, the other hand is used to push against the plate 43, causing the jaw 30 to move toward the jaw 27. Further movement of the plate 43, after the jaws 27 and 30 respectively engage the side walls of the tire, compresses the spring 45. When the plate 43 is released, the spring 45 urges the plate 43 toward the handle 26. The plate 43 engages the lip 48, causing the lever 47 to tilt to its latching position as shown in solid line in FIG. 5. The arcuate sides of the square opening of the lever 47 engage the arm 22. The effective size of the opening in the direction parallel to the axis of the arm 22 becomes smaller than the cross section of the arm 22 due to the angular orientation assumed by the lever 47, thus preventing further movement. Accordingly, the jaws 27 and 30 firmly grip the tire therebetween.

The spring 45 thus serves three purposes. First, it constitutes a linkage between the plate 43 and the jaw 30, meaning that when one grasps the plate 43 and moves it to the left or the right, the jaw 30 follows. Secondly, the spring 45 biases the jaw 30 against the side wall 15 of the tire 13 when one pushes against the plate 43. Finally, the spring 45 causes self-engagement of the latching means 34. In other words, when the plate 43 is released, the spring 45 urges the plate 43 to the left and causes the lever 47 to assume its latching condition.

When it is desired to release the target 20, the lever 47 is drawn against the plate 43, as shown in phantom in FIG. 5, thereby releasing the latching means 34. The lever 47 is held against the plate 43 and the two are drawn toward the handle 26.

Mounted on the arm 22 adjacent the handle 26 is a spirit level 50 (FIGS. 2 and 3) consisting of a vial containing liquid. By use of the level 50, the mechanic can make a slight adjustment in the orientation of the target 20 to be sure that the arm 22 is horizontal.

The target 20 further comprises a scale 60 comprising a rectangular sheet bent to form a rectangular plate 61 and a flange 62 normal thereto. The plate 61 bears parallel lines and numerals signifying distances inwardly from the right-hand edge of the plate 61. The scale 60 is slidably movable on the arm 23. To that end, the target 20 further comprises a pair of guides 65 and 75. Referring to FIG. 6, the guide 65 is made of a sheet metal strip bent to form a rectangular housing 66 having a rectangular opening 67, the width of which is slightly greater than the width of the arm 23. The longer dimension of the opening 67 is long enough to provide room for the arm 23 and an elongated rectangular nut 68. The housing 66 has turned-down ends 69 to confine the nut 68. The guide 65 includes a pair of flanges 70 respectively riveted to the plate 61 and the flange 62. A thumb screw 71 passes through an opening in the housing 66 and is threaded into the nut 68 and further extends into an opening 23a in the arm 23, as will be further explained.

The second guide 75 (FIGS. 1,2,7) is a metal strip bent to form a square housing 76 having a square opening therethrough, and a pair of attachment flanges 77 respectively riveted to the plate 61 and the flange 62. The dimensions of the opening in the housing 76 are slightly greater than the dimensions of the arm 23 so that the target 20 can slide freely therealong.

The plate 61 is at an acute angle 80 with respect to a plane passing through the arms 22 and 23 (such plane being represented by the center line in FIG. 6). In an actual embodiment, the angle 80 was 26°.

To move the scale 60, the thumb screw 71 is loosened. The scale 60 is moved to a selected position in which the screw 71 is aligned with a selected one of the three openings 23a and then tightened so as to pass through such selected opening and engage an inner surface of the arm 23, as shown in FIGS. 6 and 7. Alternately, the scale 60 can be moved to a selected position in which the thumb screw 71 is not aligned with one of the openings 23a. The screw is tightened so that its end engages the exterior of the arm 23, thereby holding the scale 60 at such selected position. The first modus operandi insures that the scales of the two targets on opposite sides of the vehicle can be positioned at the same distance from a selected reference point.

The target 20 is mounted on a selected tire in the manner previously described, that is, the jaws 27 and 30 are separated, slipped onto the selected tire and tightened. Because the target 20 engages both side walls, it can be located at an advantageous position beneath the hub 12 and in back of the front tire 13. The plate 61 being at an obtuse angle can be oriented vertically even though the jaws 27 and 30 are not horizontal but more nearly radially oriented with respect to the tire. Referring to FIG. 1, the scale 60 is outside of and rearward of the cylinder defined by the tread surface 14. This is desirable because it is possible to measure the distance of the scale 60 from any selected part of the automobile 10 such as the body, the frame, the drive shaft or the side wall 15. The scale of many prior art targets is within the cylinder defined by the tread surface 14 and, therefore, such measurements are difficult to make.

In FIG. 1, being outside of the cylinder of the tread surface means that the scale is behind the front tire 13. When the target 20 is mounted on a rear tire, being outside of the cylinder means it will be in front of the tire.

The target depicted in FIG. 1 would be mountable on the right rear wheel also. The one to be mounted on the right front tire or on the left rear tire would have a reverse orientation.

What has been described therefore is an improved target for use in track alignment of vehicles, the target being located outside the cylinder of the tread surface, to enable the scale itself to be place in a truly horizontal position and to enable the position of the scale to be slidably adjusted to any distance from any selected reference point on the vehicle.

We claim:

1. A target for use in equipment for aligning a vehicular wheel which carries a tire thereon having a tread surface and a pair of side walls, said target comprising an elongated body, first and second jaws depending from said body for respectively engaging the side walls of the tire, at least one of said jaws being movable toward and away from the other of said jaws, first means for latching said jaws at a selected spacing therebetween so as to be mounted on the tire, scale means slidably carried by said body, and second means for latching said scale at a selected position on said body.

2. The target of claim 1, wherein one of said jaws is integral with said body.

3. The target of claim 1, wherein said jaws are located at one end of said body and further comprising a handle on the other end of said body.

4. The target of claim 1, and further comprising a level on said body.

5. The target of claim 1, and further comprising guide means attached to said scale means and slidably receiving said body therein.

6. The target of claim 1, and further comprising a pair of longitudinally spaced apart guide means attached to said scale means and slidably receiving said body therein.

7. The target of claim 6, wherein said second means includes a thumb screw carried by one of said guide means.

8. The target of claim 1, wherein said first jaw is fixed and said second jaw moves toward and away from said first jaw.

9. The target of claim 8, wherein said first means includes bearing means and a spring between said second jaw and said bearing means and a release lever, said release lever automatically engaging said body for preventing retrograde movement of said second jaw, said release lever being pivotal to a release position to enable said second jaw to be moved away from said tire side wall.

10. The target of claim 9, wherein said bearing means includes a plate and a U-shaped member attached thereto, said body extending through said plate and said U-shaped member, said release lever being located between said U-shaped member and said plate and also slidably receiving said body.

11. The target of claim 1, wherein said scale means includes a plate.

12. The target of claim 11, wherein said plate forms an acute angle with a plane perpendicular to a plane passing through the axes of said jaws.

13. The target of claim 12, wherein said angle is about 26°.

14. A target for use in equipment for aligning a vehicular wheel which carries a tire thereon having a tread surface and a pair of side walls, said target comprising first and second substantially parallel elongated arms, spacer means between said elongated arms for holding them in fixed spaced relationship, first and second jaws depending from said first arm for respectively engaging the side walls of the tire, at least one of said jaws being movable toward and away from the other of said jaws, first means for latching said jaws at a selected spacing therebetween so as to be mounted on the tire, scale means slidably carried by said second arm, and second means for latching said scale at a selected position on said second arm.

15. The target of claim 14, wherein each of said arms is tubular.

16. The target of claim 15, wherein each of said arms is square in transverse cross section.

17. The target of claim 14, wherein said first jaw is integral with said first arm.

18. The target of claim 14, wherein said first jaw is at one end of said first arm and further comprising a handle at the other end of said second arm.

19. The target of claim 14, and further comprising a level mounted on said first arm.

20. The target of claim 14, and further comprising guide means attached on said scale means and slidably receiving said second arm therein.

21. The target of claim 14, and further comprising a pair of longitudinally spaced-apart guide means attached to said scale means and slidably receiving said second arm therein.

22. The target of claim 21, wherein said second means includes a thumb screw carried by one of said guide means.

23. The target of claim 14, wherein said first means includes bearing means and a spring between said second jaw and said bearing means and a release lever, said release lever automatically engaging said first arm for preventing retrograde movement of said second jaw, said release lever being pivotal to a release position to enable said second jaw to be moved away from said tire side wall.

24. The target of claim 23, wherein said bearing means includes a plate and a U-shaped member attached thereto, said first arm extending through said plate and said U-shaped member, said release lever being located between said U-shaped member and said plate and also slidably receiving said second arm.

25. The target of claim 14, wherein said second arm is located beneath said first arm when said target is mounted on the tire.

* * * * *